United States Patent [19]

Roberts

[11] Patent Number: 4,736,519

[45] Date of Patent: Apr. 12, 1988

[54] NUTPLATE INSTALLATION TOOL
[75] Inventor: Robert M. Roberts, Glenolden, Pa.
[73] Assignee: The Boeing Company, Wash.
[21] Appl. No.: 913,273
[22] Filed: Sep. 30, 1986
[51] Int. Cl.⁴ .............................................. B23P 21/00
[52] U.S. Cl. ........................................ 29/771; 29/811; 29/813
[58] Field of Search ................. 29/771, 809, 811, 813, 29/244, 252

[56] References Cited
U.S. PATENT DOCUMENTS
326,141  9/1885  Oaks ................................... 29/771 X Primary Examiner—Howard N. Goldberg
Assistant Examiner—Ronald S. Wallace
Attorney, Agent, or Firm—Jones, Tullar & Cooper

[57] ABSTRACT

A tool for installing nutplates to a structural part. The tool is portable or useable with a robot. The tool includes a supply of nutplates and a rivet feeding and insertion mechanism. The rivets are inserted in the structural part, followed by the positioning of a nutplate into engagement with the rivets and finally by clamping of the rivets to retain the nutplate in assembly with the clamped rivets.

20 Claims, 6 Drawing Sheets

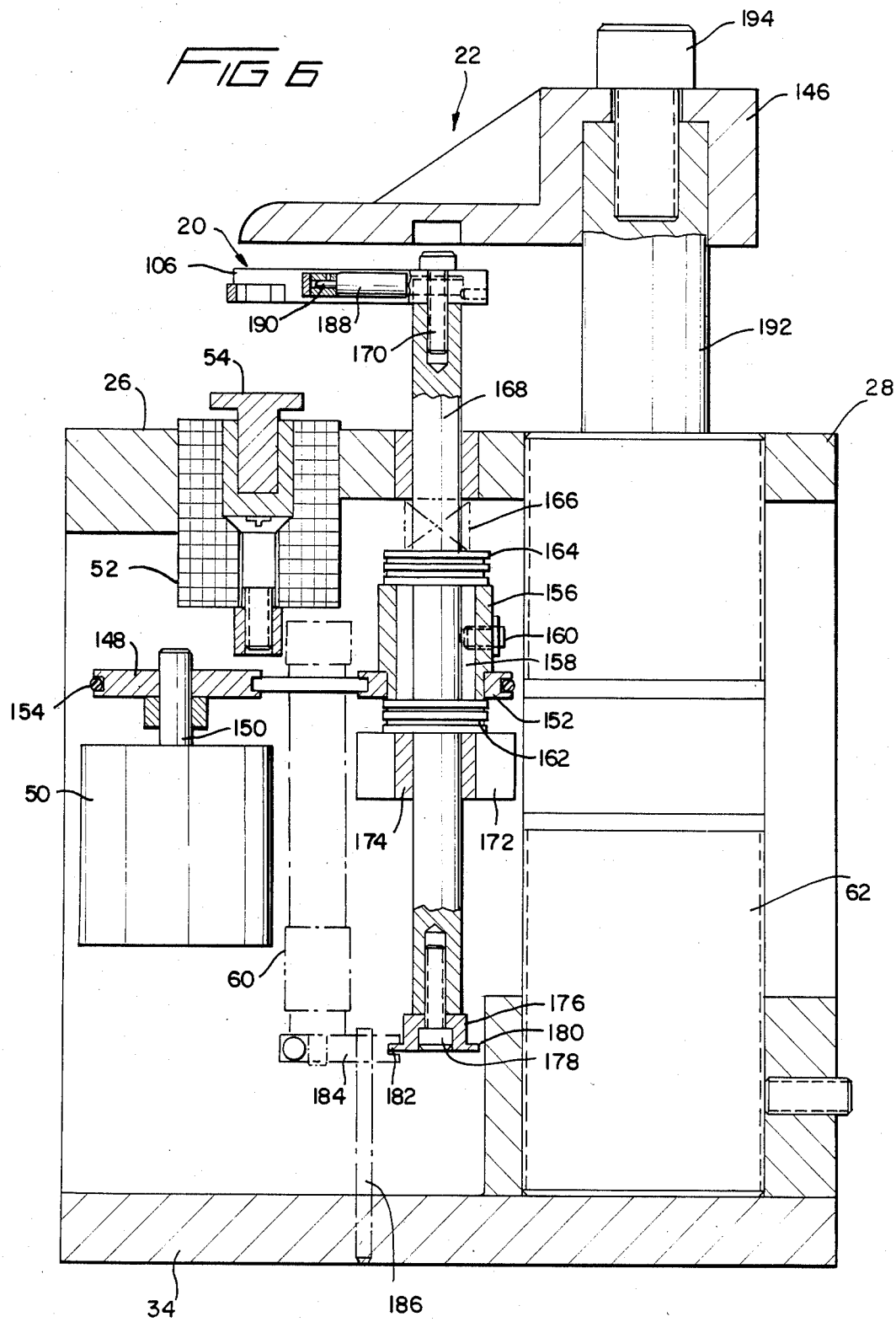

NUTPLATE INSTALLATION TOOL

FIELD OF THE INVENTION

The present invention relates to a tool and in particular to a tool which is portable or employed as a robotic end effector for installaing nutplates onto a structural part.

BACKGROUND OF THE INVENTION

Nutplates are extensively used in, for example, aircraft. They serve as anchoring devices and require several manual and power tool operations to install. For example, the installation of nutplates is required on the fixed leading edges of both the 757 and 767 model commercial aircraft being manufactured by the Boeing company. Each model presently requires approximately 1000 nutplates per wing ship set. Various steps are involved in installing a nutplate, and these are quite labor intensive. These steps, described with reference to FIG. 1, involve the following operations: (1) a pilot hole 1 is drilled in the structural part 2; (2) two rivet holes 3 are drilled adjacent to the pilot hole and countersunk; (3) the pilot hole is opened up to final screw hole size; (4) all three holes are deburred by hand; (5) rivets 4 are inserted by hand in a one by one fashion into the rivet holes; (6) a holding screw (not shown) is placed in the center screw hole, the nutplate 5 is positioned over the rivets which were installed during step (5) and the holding screw is then tightened; (7) the rivets are swaged one by one; and (8) the holding screw is removed completing the installation.

It is readily apparent that when this eight step procedure is repeated for the 1000 nutplates per wing ship set as noted above, a considerable investment in manhours is required.

Any measure which would reduce the total steps required to install the nutplates would be useful.

SUMMARY OF THE INVENTION

According to the present invention a unique tool is introduced which will perform the following operations sequentially and automatically: rivet feed and rivet insertion; nutplate feed and nutplate positioning; rivet squeezing. In effect, steps (5)–(8) noted above are replaced in that they are performed sequentially and automatically by the tool of the present invention. As a result a considerable savings in manhours is realized.

The tool is preferably a portable, hand held tool, or useable with a robot. It contains a supply of nutplates and access to a supply of rivets. These are dispensed from the tool in an automatically controlled manner and the nutplate finally assembled.

While the invention was developed for installing nutplates, it can be used for installing other types of fasteners or support elements which are mounted with rivets. It would be necessary to adapt the supply mechanism of the tool to accommodate the particular size and shape of the fasteners or support elements to be dispensed.

Figure 2:
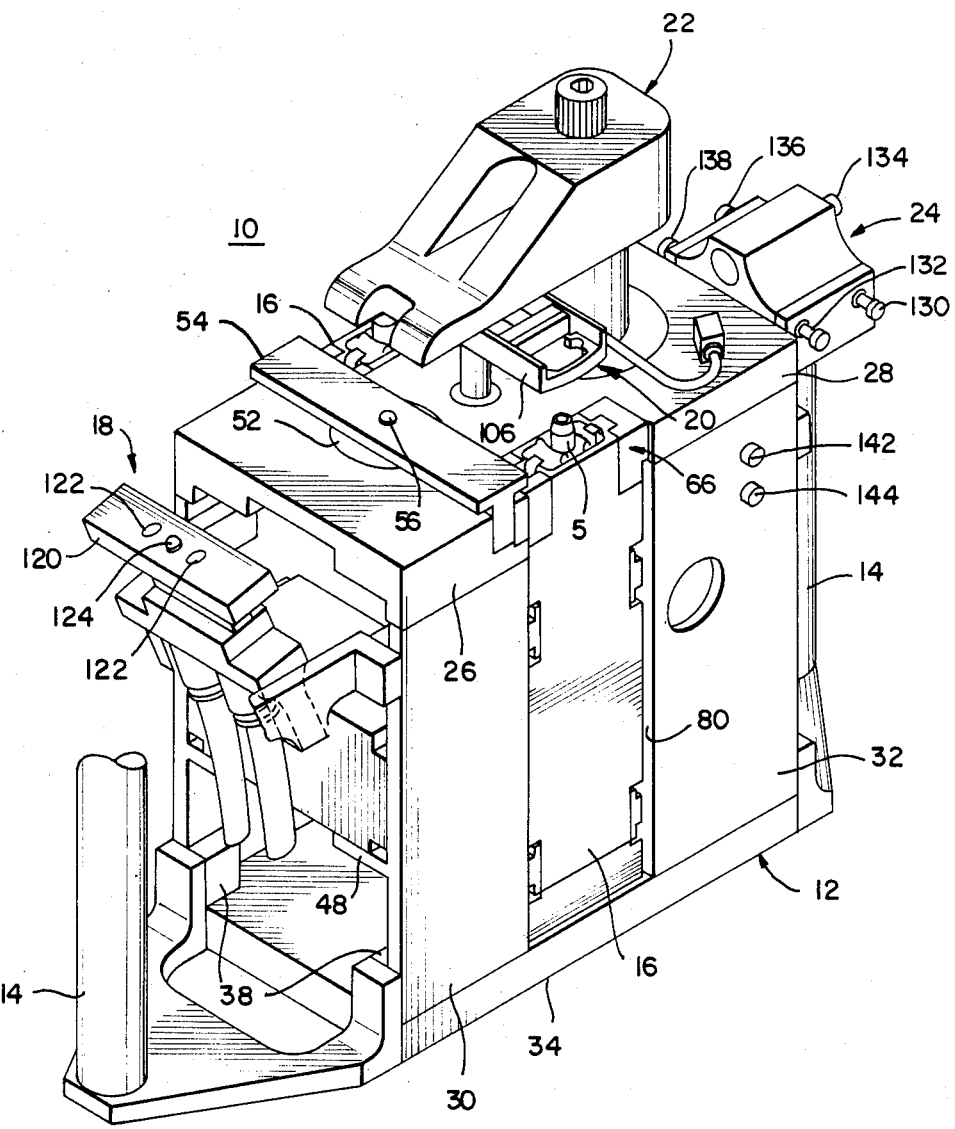

Six figures have been selected to illustrate a preferred embodiment of the invention. Included are:

FIG. 2, which is a partial perspective view of a preferred embodiment of the tool assembly of the present invention.

Figure 1:
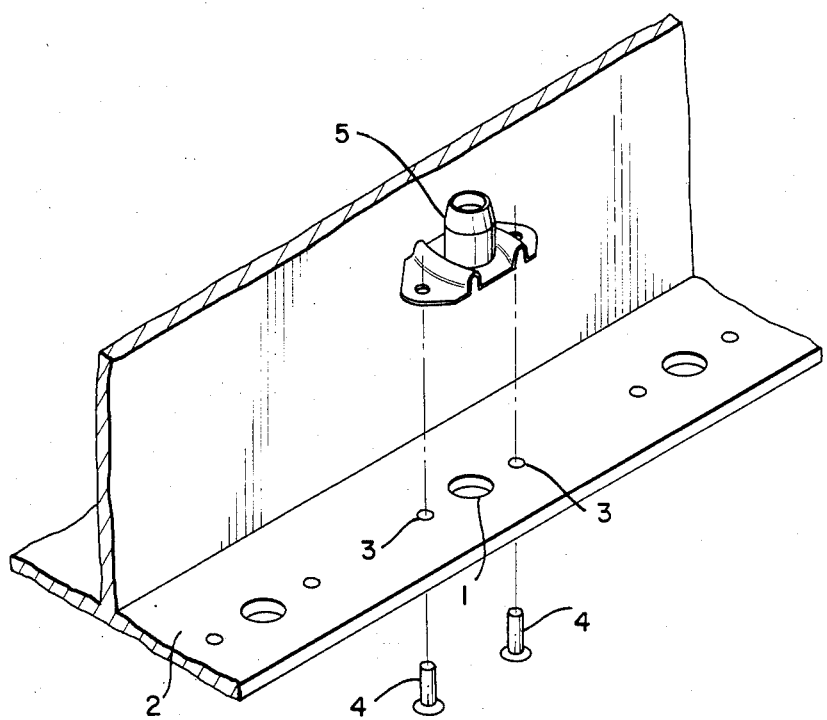
FIG. 1 is a schemactic perspective view of a structural part and a nutplate assembly, referred to above in the background discussion for the purpose of better understanding one application of the invention.
Figure 3:
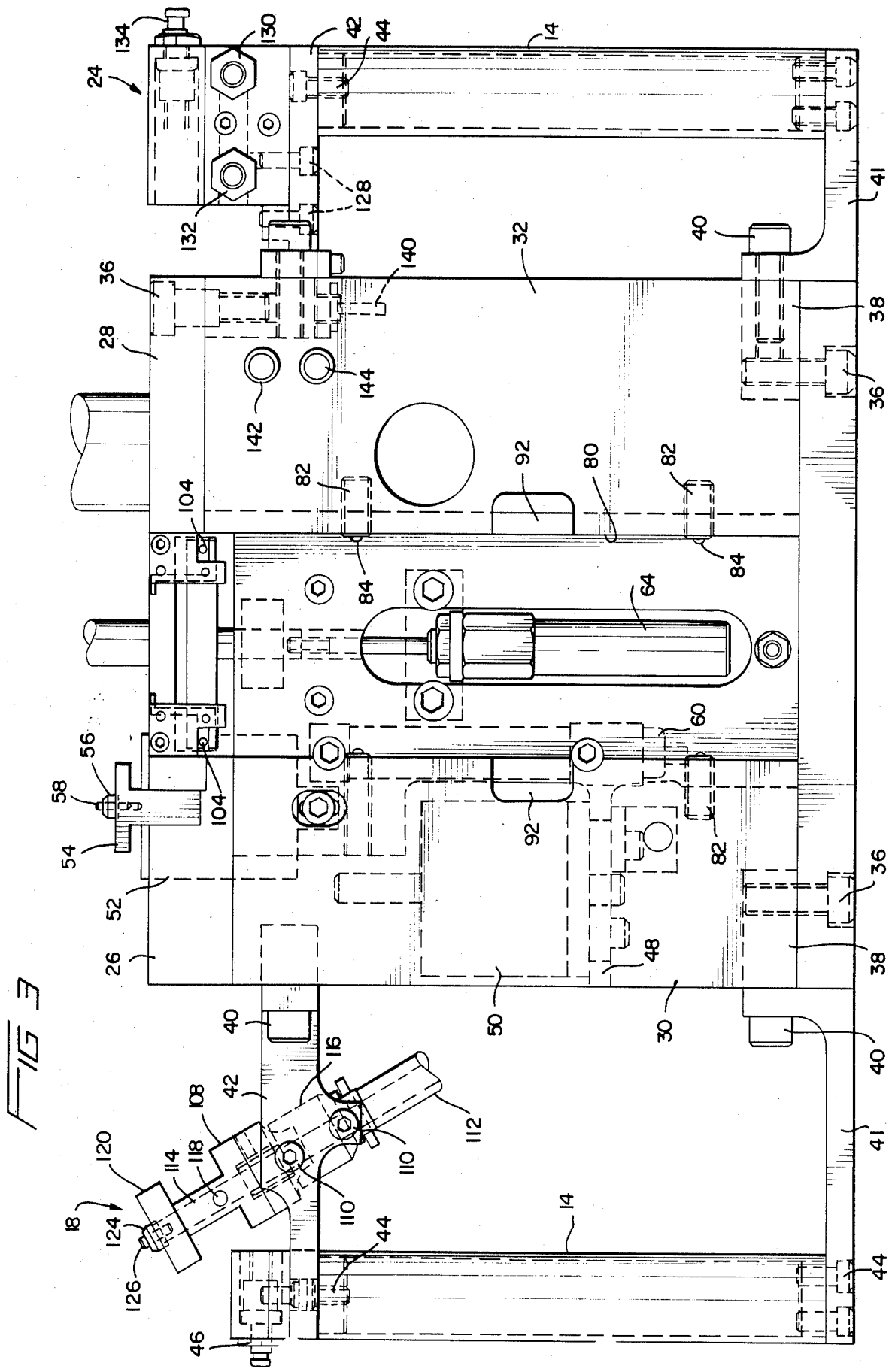
Figure 4:
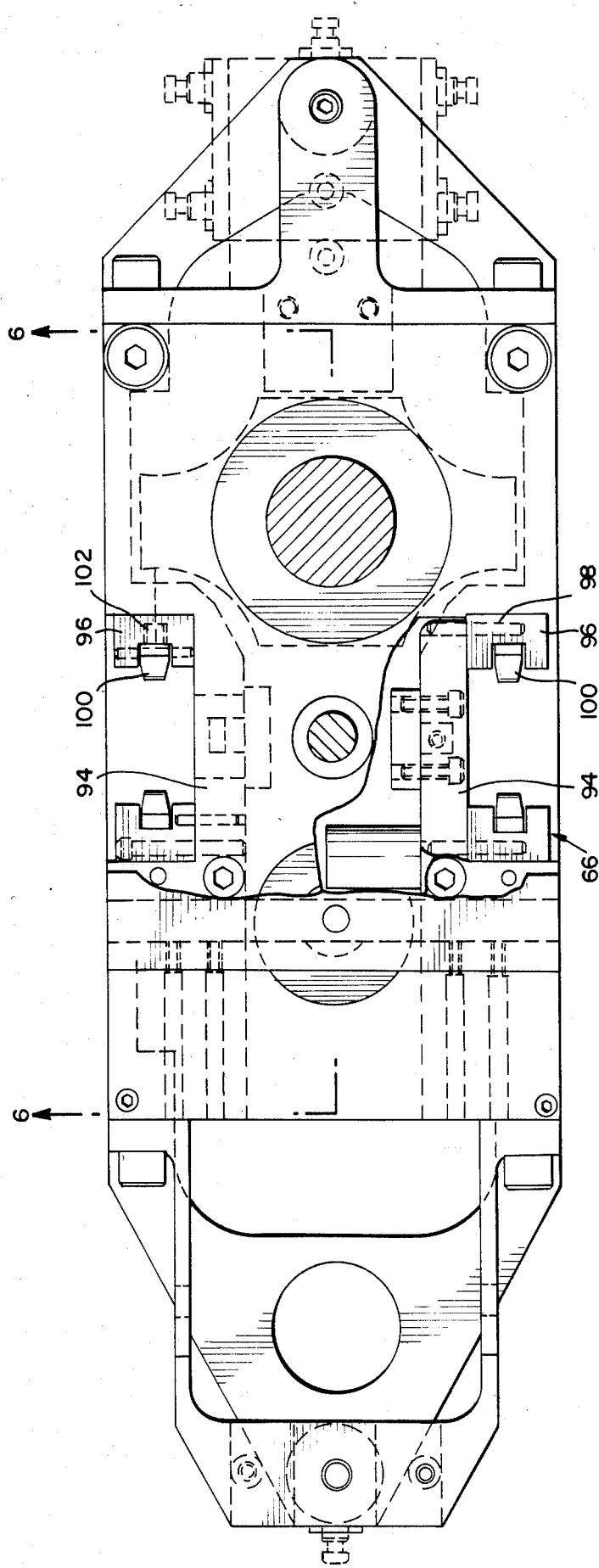
Figure 5:
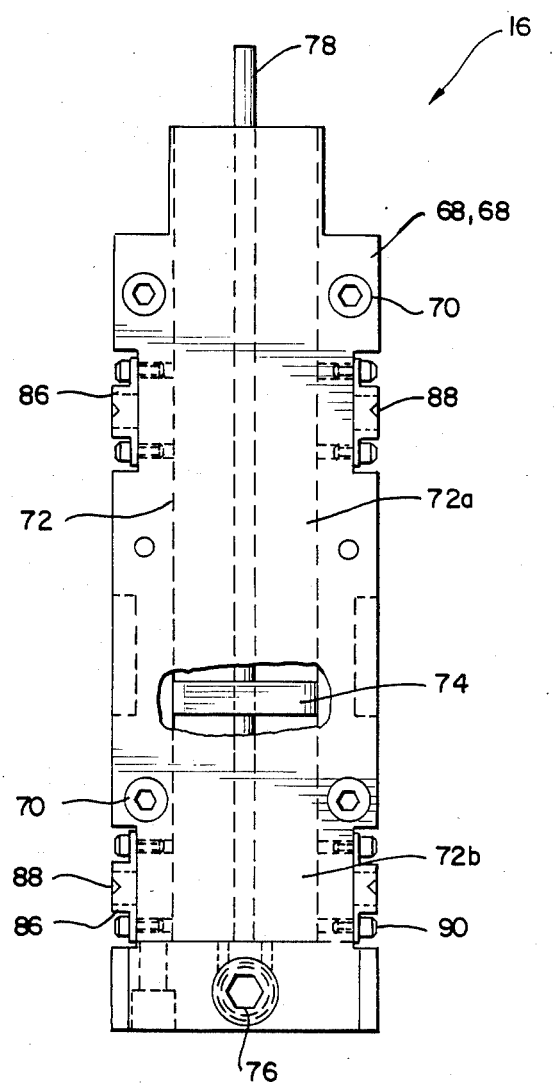

FIG. 3, which is a front elevational view of the tool of FIG. 2 without the nutplate magazines;

FIG. 4, which is a top view of the tool of FIGS. 1 and 2;

FIG. 5, which is front elevational view of a nutplate magazine; and

FIG. 6, which is a side view partly in section taken along line 6—6 of FIG. 4.

DESCRIPTION OF THE PREFERRED EMBODIMENT

In its preferred form the tool assembly 10 is portable and at present weights approximately 12 lbs., excluding its connecting tubes.

Referring to FIG. 2, the tool assembly 10 includes a housing 12, a pair of handles 14, two nutplate magazines 16, a rivet feed and insertion mechanism 18, a pick-up and transfer mechanism 20, a clamping assembly 22 and a switch block 24 including certain manually operable switches to control the operation of the tool.

The housing 12 comprises, in essence, a series of connected plates: two top plates 26 and 28, four side plates, 30 and 32 (two on each side), and a bottom plate 34. These plates are joined together by a series of socket screws 36 (shown best in FIG. 3).

The side plates 30 and 32, on both sides, include bosses 38 which receive socket screws 40 for mounting the bottom handle plates 41 and top handle plates 42 to the assembled housing. The left-side top plate 42 (FIG. 3) also serves to mount the rivet feed and insertion mechanism 18 to the assembled housing, and the right-side top plate 42 also serves to mount the switch block 24 to the assembled housing.

The handles 14 are connected to their bottom and top plates 41 and 42 by socket screws 44. The left-hand handle 14 (FIG. 3) also provides a mounting for a push-button switch 46, the purpose of which will be described hereinafter.

The left-side side plates 30 are provided with ledges 48 which are coplanar and extend toward each other (FIG. 2) and serve to mount a rotary actuator 50, the purpose of which will be described hereinafter. The top plate 26 has a magnet 52 and a bucking bar 54 mounted thereto. The bucking bar 54 has a post 56 mounted thereto by a socket screw 58. The post 56 serves as an alignment post.

Mounted within the housing to the left of center is a hydraulic cylinder assembly 60, which operates in conjunction with the pick-up assembly. Further details of the hydraulic cylinder assembly 60 can be seen in FIG. 6 and will be described in more detail hereinafter. Mounted within the housing to the right of center is a hydraulic cylinder assembly 62 which operates in conjunction with the clamping assembly 22. In approximately the center of the housing toward the front and rear side plates there is mounted a hydraulic cylinder 64 which operates in conjunction with a nutplate retaining assembly 66.

The nutplate magazines 16 (FIG. 5) include a pair of plates 68 joined together by four socket screws 70. When joined, the plates 68 define a chamber 72. A piston 74 divides the chamber 72 into a nutplate loading chamber 72a and a pneumatic chamber 72b. A tube fitting 76 admits pressurized air to the pneumatic chamber 72b. A guide rod 78 is connected to the piston 74 on both sides thereof. The guide piston rod 78 serves to stack and align the nutplates in the loading chamber 72b thereby guiding them out of the loading chamber 72a as they are being dispensed.

The nutplate magazines 16 are received within recesses 80 defined by the side plates 30 and 32 and are retained in assembly with the housing by ball plungers 82 each including spring loaded balls 84. For this purpose each nutplate magazine has a corresponding ball button 86 which has a recess 88 within which a corresponding ball 84 is received for locking the nutplate magazines in assembly. The ball buttons 86 are secured to the sides of the nutplate magazine by socket screws 90. With the noted design, the nutplate magazines are snapped-into assembly with the housing and positively retained (locked) in assembly by the engagement of the balls 84 with their respective recesses 88. The nutplate magazines are easily withdrawn from the noted positive retention after first releasing them from their engagement with their respective nutplate retaining assembly by simply prying them out or by a specially designed tool which is inserted in the cut-out portions 92, formed by the plates 30 and 32, for gripping the side surfaces of the magazine and disengaging the balls 84 from their respective recesses 88.

As shown in FIG. 4, at the top of each recess 80 there is situated a nutplate retaining assembly 66 which includes a T-piece 94 attached to a hydraulic cylinder assembly 60. Mounted in turn to the T-piece 94 are spaced apart retaining clip mounts 96 which are mounted by pins 98. Extending outwardly from each retaining clip mount 96 is a retaining clip 100. The retaining clips 100 are biased toward each other by a spring 102. Each retaining clip mount 96 is pivotably mounted by a pivot pin 104 to the top plates 26 and 28 (FIG. 3), i.e., the left-hand retaining clip mount is pivotably mounted to the top plate 26 and the right-hand retaining clip mount is pivotably mounted to the top plate 28. Movement of the T-piece 94 upwardly causes the retaining clip mounts 96 to pivot upwardly about their pins 104 thereby pivoting upwardly the retaining clips 100. When pivoted upwardly, the nutplate magazine can be withdrawn from the housing as noted above.

In the retained position, the nutplate is ready to be picked-up by the pick-up plate 106 of the pick-up assembly 20 for transfer toward the bucking bar 54. For this purpose, the front end of each retaining clip 100 has a truncated conical shape which permits the pick-up plate 106 to engage the truncated front ends and move the retaining clips 100 against their spring biasing force sufficiently to permit release of a nutplate into the pick-up plate.

The rivet supply and insertion mechanism 18 includes a rivet block 108 which is fastened to the left-side top plate 42 by socket screws 110. Two rivet supply tubes 112 are connected to the rivet block 108. Formed in the rivet block 108 are two parallel rivet passages 114 which are connected to a respective rivet tube holder 116 forming thereby an extension of the supply tubes 112. Mounted to the rivet block 108 is a pneumatic actuator 118 for each passage 114. The actuators 118 include a front end stop (not shown) which is actuated to extend into its respective passage 114 and act as a rivet stop. Connected to the back end of each actuator is an air supply tube (not shown). The passages 114 terminate in an upper flange 120 which includes two openings 122 through which the rivets exit and are supplied to the rivet holes 3 of the structural part 2. The upper flange also includes a post 124 mounted thereto by a socket screw 126. The post 124 serves as an alignment post.

The switch block 24 is secured to the right-side top plate 42 by socket screws 128. The switch block 24 houses push button switchs 130, 132, 134, 136, and 138. These switches, as well as switch 46 and toggle switch 140, are connected to a controller (not shown) which controls a program sequence for operating the tool.

The switches 130 and 136 each independently set the program and the tool functioning through the first two separate installation steps, i.e., steps (5) and (6) noted above, except that the rivets are inserted by the tool and the nutplate positioned over the rivets by the tool and without a holding screw. The switches 134 and 46 control the clamping operation, i.e., the last two separate installation steps (7) and (8) noted above except that a holding screw is not utilized. In effect, therefore, the last two steps are in fact a single step according to which the rivet tails are swaged (clamped) by the tool.

The switches 132 and 138 are repeat switches which allow the operator to repeat the first or second installation step if necessary.

The toggle switch 140 operates in conjunction with the lights 142 and 144 and controls the swing approach mode of the pick-up plate 106 to swing either right or left between the nutplate magazines 16 (front or back) and the bucking bar 54. The light 142 or 144 is lit depending on whether the pick-up plate 106 swings right or left. The lights inform the operator as to the set mode of operation of the pick-up plate. In its neutral position, the toggle switch 140 causes the hydraulic cylinder assemblus 60 to lift their respective T-piece 94 allowing the associate nutplate magazines to be withdrawn from the housing. The toggle switch 140 along with the switches 132 and 138 operate to change the swing approach from right to left or from left to right.

In the manual operation, the operator grasps handles 14 and places upper flange 120 flush against the structural part with post 124 in pilot hole 1, thereby aligning opening 122 with the rivet holes 3 on each side of the pilot hole 1. The operator then depresses switch 130 or 136 causing a rivet to be fed from a rivet supply and inserted into rivet holes 3. The operator then removes the upper flange 120 from the structural part and places bucking bar 54 flush against the structural part with the post 56 in pilot hole 1. Next the operator again depresses switch 130 or 136 causing the pick-up plate 106 to pick-up a nutplate from one of the nutplate magazines, swing over to the bucking bar 54 and drop the nutplate over the rivets and post 56. The operator then depresses switches 134 and 46 and causes the forked clamping arm 146 of the clamping assembly 22 to swage the exposed tails of the two rivets thereby retaining the dropped nutplate into assembly with the swaged rivets on the structural part.

The switches 130 and 136 and 132 and 138 are duplicate function switches. That is, the operator chooses one set or the other depending on whether the structural part has a right-hand or left-hand flange on which the nutplates are being installed.

The rivet supply may be the feeder bowl arrangement similar to that supplied by ITC Automation, Inc,, of Dayton, Ohio.

The various mechanisms for controlling the operation of the pick-up and transfer mechanism 20 and the clamping assembly 22 are shown in FIG. 6. The rotary actuator 50 has a no-slip pulley 148 mounted to a shaft 150. The pulley 148 is connected to a no-slip pulley 152 by a no-slip positive drive belt 154. The pulley 152 is in turn mounted to a sleeve 156 which is fastened to a super ball push bearing 158 by a lock set screw 160. The sleeve 156 and bearing 158 extend between thrust bearings 162 and 164. Between the bearing 164 and the top plate 26 there is located a spring 166 which surrounds a ball-groove shaft 168, to the top of which the pick-up plate 106 is mounted by a socket screw 170. The bearing 162 rests on a bridge 172 which extends from side plates 30, as do the ledges 48 (not shown in FIG. 6). At the bridge 172, the shaft 168 is surrounded by a bushing 174. At its opposite end the shaft 168 has a lift washer 176 mounted thereto by a socket screw 178. The lift washer 176 has a flange 180 which is received within a slot 182 of a lift arm 184 connected to the cylinder assembly 60. A locating pin 186 engages the lift arm 184.

For the installation of a nutplate, the tool is brought to the structural part and aligned as noted above. The magnet 52 holds the structural part against the bucking bar 54, and the switching sequence noted above initiated. The cylinder 60 and actuator 50 are energized which causes the shaft 168 to first be rotated to either nutplate magazine, lowered to pick-up a nutplate, raised and rotated again to the position shown in FIG. 6. At this time the nutplate is released as noted above. For this purpose, a cylinder 188 mounted in the pick-up plate 106 releases a clamp 190 which was holding the nutplate. Once the nutplate is installed, the clamping arm 146 is lowered as noted above. For this purpose the arm 146 is mounted to a shaft 192 by a socket screw 194.

With the nutplate tool described above significant saves in manhours for installing nutplates can be realized.

What is claimed is:

1. A nutplate installation tool for installing nutplates in a structural part, comprising:
   a housing;
   nutplate supply means mounted to the housing;
   rivet feed and insertion means mounted to the housing, said rivet feed and insertion means inserting a pair of spaced apart rivets in the structural part;
   pick-up and transfer means mounted to the housing for transferring the nutplates from the nutplate supply means to the structural part for engaging with the inserted rivets; and
   clamping means mounted to the housing for clamping the inserted rivets to the engaged nutplate to thereby retain the nutplate in assembly with the clamped rivets.

2. The nutplate tool as defined in claim 1, further comprising:
   a pair of handles; and
   mounting means associated with each handle for mounting the handle to the housing for manually manipulating the tool.

3. The nutplate tool as defined in claim 2, wherein the mounting means of one of said handles also serves to mount said rivet feed and insertion means to the housing.

4. The nutplate tool as defined in claim 1, further comprising:
   a switch block;
   a pair of handles; and
   mounting means associated with each handle for mounting the handle to the housing for manually manipulating the tool, wherein the mounting means of one of said handles also serves to mount said feed and insertion means to the housing and the mounting means of the other of said handles also serves to mount the switch block to the housing.

5. The nutplate tool as defined in claim 1, wherein the housing comprises a bottom plate, two pairs of side plates, two top plates and means for connecting the plates together.

6. The nutplate tool as defined in claim 5, wherein the nutplate supply means comprises at least one magazine mounted to the housing between a pair of side plates.

7. The nutplate tool as defined in claim 6, wherein each side plate of the pair of side plates between which a magazine is mounted includes mounting means cooperating with mounting means on the magazine for retaining the magazine in assembly with the side plates.

8. The nutplate tool as defined in claim 7, wherein the nutplate magazine includes two plates, means for mounting the two plates to each other and a piston, said mounted plates defining a chamber within which the piston extends to divide said chamber into a nutplate loading chamber and an actuating chamber for use in displacing the piston into the nutplate loading chamber.

9. The nutplate tool as defined in claim 5, wherein the nutplate supply means conprises two magazines mounted to the housing each between a respective pair of side plates.

10. The nutplate tool as defined in claim 9, wherein each side plate of each pair of side plates between which a magazine is mounted includes mounting means cooperating with mounting means on the associated magazine for retaining the associated magazine in assembly with the side plates.

11. The nutplate tool as defined in claim 10, wherein each nutplate magazine includes two plates, means for mounting the two plates to each other and a piston, said mounting plates defining a chamber within which the piston extends to divide said chamber into a nutplate loading chamber and an actuating chamber for use in displacing the piston into the nutplate loading chamber.

12. The nutplate tool as defined in claim 1, further comprising:
   nutplate retaining means mounted to the housing for retaining nutplates from the nutplate supply means for pick-up by said pick-up and transfer means.

13. The nutplate tool as defined in claim 12, wherein the nutplate retaining means is mounted for displacement relative to the nutplate supply means for removal of the nutplate supply means from the housing.

14. The nutplate tool as defined in claim 5, further comprising:
   two nutplate retaining assemblies mounted to a top plate of the housing, each between a pair of side plates for retaining nutplates from an associated nutplate supply means for pick-up by said pick-up and transfer means.

15. The nutplate tool as defined in claim 14, wherein each nutplate retaining assembly is mounted for displacement relative to its associated nutplate supply means for removal of the associated nutplate supply means from the housing.

16. The nutplate tool as defined in claim 5, wherein the nutplate supply means comprises two magazines mounted to the housing between each pair of side plates, and wherein the pick-up and transfer means includes a pick-up and transfer plate and means for rotating the pick-up and transfer plate between the two magazines.

17. The nutplate tool as defined in claim 16, further comprising:
   means mounted to a top plate of the housing between the pairs of side plates for receiving nutplates transferred from the nutplate supply means by the pick-up and transfer means.

18. The nutplate tool as defined in claim 17, wherein said means for receiving nutplates transferred from the nuplate supply means by the pick-up and transfer means is mounted adjacent to said rivet feed and insertion means.

19. A nutplate installation tool for installing nutplates in a structural part, comprising:
   a housing comprising a bottom plate, two pairs of side plates, two top plates and means for connecting the plates together;
   two nutplate containing magazines mounted to the housing each between a respective pair of side plates;
   rivet feed and insertion means mounted to the housing, said rivet feed and insertion means inserting a pair of spaced apart rivets in the structural part;
   pick-up and transfer means mounted to the housing for transfering the nutplates from each nutplate magazine to the structural part for engaging with the inserted rivets; and
   clamping means mounted to the housing for clamping the inserted rivets to the engaged nutplate to thereby retain the nutplate in assembly with the clamped rivets.

20. The nutplate tool as defined in claim 19, further comprising:
   a pair of handles;
   mounting means associated with each handle for mounting the handle to the housing for manually manipulating the tool; and
   a switch block, wherein the mounting means of one of said handles also serves to mount said rivet feed and insertion means to the housing, and the mounting means of the other of said handles also serves to mount the switch block to the housing.

\* \* \* \* \*

UNITED STATES PATENT AND TRADEMARK OFFICE
CERTIFICATE OF CORRECTION

PATENT NO. : 4,736,519

DATED : April 12, 1988

INVENTOR(S) : Robert M. Roberts

It is certified that error appears in the above-identified patent and that said Letters Patent is hereby corrected as shown below:

Claim 1, column 5, line 41, "in" should be -- on --.

Claim 19, column 7, line 17, "in" should be -- on --.

Signed and Sealed this

Second Day of August, 1988

Attest:

DONALD J. QUIGG

Attesting Officer

Commissioner of Patents and Trademarks